Aug. 25, 1936.    A. F. SPITZGLASS    2,052,512
FLOW PROPORTIONING MEANS
Filed June 4, 1934

INVENTOR.
Albert F. Spitzglass
BY
ATTORNEY.

Patented Aug. 25, 1936

2,052,512

UNITED STATES PATENT OFFICE 2,052,512

FLOW PROPORTIONING MEANS

Albert F. Spitzglass, Chicago, Ill., assignor, by mesne assignments, to The Brown Instrument Company, Philadelphia, Pa., a corporation of Pennsylvania Application June 4, 1934, Serial No. 728,877

20 Claims. (Cl. 137—164)

This invention relates to control mechanism, and is illustrated as embodied in novel and simple means for varying the flow of fluid in one conduit as a function of the flow in another conduit.

There are many cases where it is desirable to vary the flow of one fluid in accordance with that of another, as for example in maintaining the proper relation of the air and the fuel for a burner, in chlorinating water, and the like. In one desirable embodiment of my invention, I utilize a flow-measuring device, shown as a flow meter connected in one of the conduits, variably to control the flow in the other conduit, as for example by variably shutting off or opening a valve therein.

In the arrangement illustrated a flow meter is arranged, as described, to control a selector which shifts a power-driven actuator selectively to engage one or another of a bank of levers or other operating devices. These devices variably engage the final actuator, shown as a lever operatively connected to the flow-controlling valve. Preferably means is provided for holding the operated device until another one takes its place.

Two desirable and simple embodiments of this latter mechanism are illustrated, and these are in themselves both of considerable novelty whether or not used to vary the flow of one fluid as a function of the flow of another.

In one embodiment, the final actuator has an inclined surface selectively engaged at different points by one or the other of the operating devices, and is thereby given different degrees of movement. In the other, the different degrees of movement are secured by causing the operating devices selectively to engage a pivoted lever at different points in its length.

Figure 1:
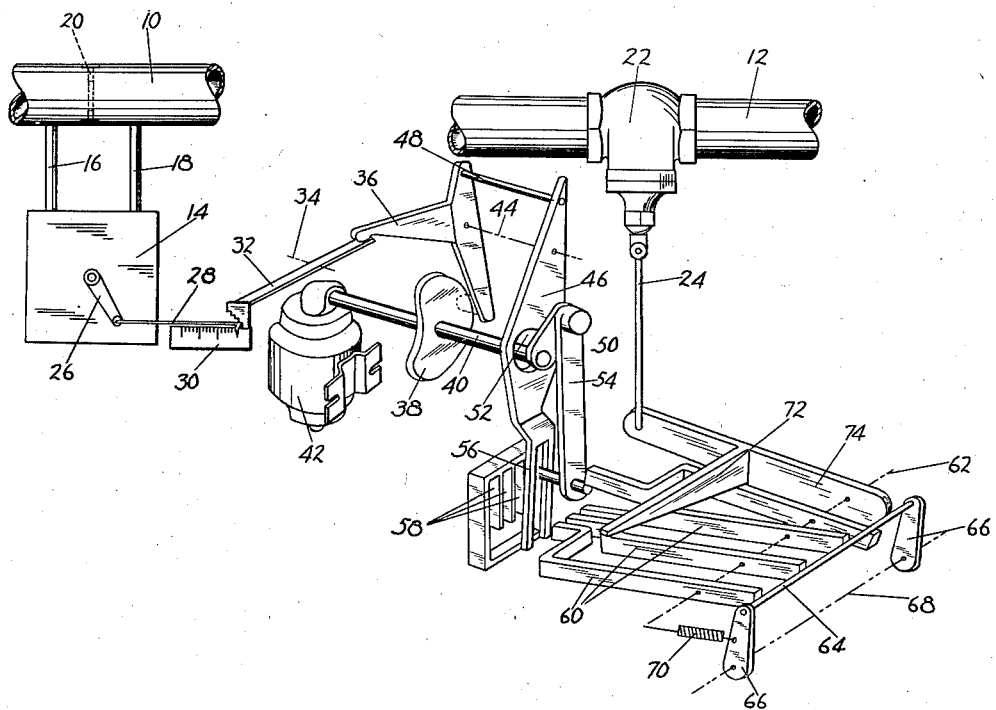
Figure 2:
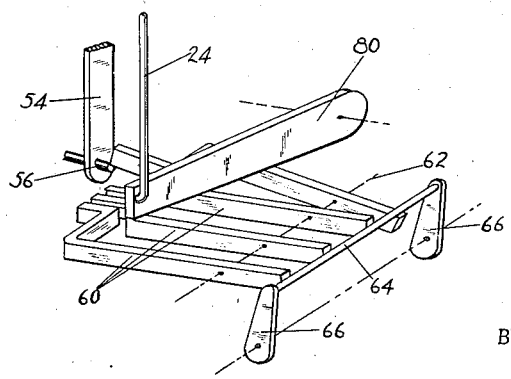

The above and other objects and features of the invention, including various novel combinations of parts and desirable particular constructions, will be apparent from the following description of the illustrative embodiments shown in the accompanying drawing, in which:

Figure 1 is a diagrammatic perspective view showing the essential operating parts of the mechanism connected to two conduits; and Figure 2 is a partial perspective view corresponding to part of Figure 1 but showing a different embodiment.

In the arrangement of Figure 1, there are two pipes or other conduits 10 and 12, and it is desired to vary the flow in the conduit 12 as a function of the flow in the conduit 10. The conduit 10 is provided with flow-measuring means, shown as a standard flow meter 14 connected by small conduits 16 and 18 to the conduit 10 on opposite sides of an orifice plate 20. The conduit 12 has flow-varying means such as a valve 22 of any desired type and construction, operated by means such as a link 24.

The flow meter 14 may be of any of several well-known types, and is therefore not illustrated in detail. It is operated in accordance with the differential of the pressures in the conduits 16 and 18, to rock an arm 26 which in turn operates an indicator 28 which is shown as having a pointer moving along a scale 30.

The indicator 28, in the arrangement illustrated, is adapted normally to intercept a tactor or lever 32, movable about an axis 34, and which is periodically raised, and then allowed to fall by gravity, by means such as a bellcrank lever 36 having on its lower arm a follower engageable with a cam 38 on a shaft 40 continuously driven at a constant speed by a suitable motor 42.

The tactor 32 has on its outer end a series of steps at different heights one or another of which, in the normal range of positions of the indicator 28, engages the indicator, thereby variably limiting the gravity movement of the bellcrank 36 when its lower arm is opposite the low part of the cam 38.

The bellcrank lever 36 is pivoted for movement about an axis 44, preferably coaxially with respect to a selector member such as a lever 46 to the upper end of which the bellcrank 36 is rigidly connected by means such as a bar 48.

The tactor 32 therefore also variably determines the angular position of the selector 46 at the time when a crank 50 on the end of shaft 40 is in its lowermost position and for at least a substantial part of the upward stroke of the crank 50. The selector 46 may be formed with a large opening 52, to make sure that it clears shaft 40 in all of its positions.

The crank 50, or an equivalent device, serves as power-driven means periodically reciprocating an operator such as a link 54. In the illustrated arrangement, the link 54 has at its lower end a cross pin 56 or the like, one end of which is embraced by a slot in the lower end of the selector 46, to be guided thereby into one or the other of a plurality of stationary guides 58.

The other end of the pin 56, or some equivalent means, according to which of the guides 58 is engaged (i. e. according to the position of the selector 46, and therefore according to which step on the tactor 32 engages the indicator 28) engages beneath the end of, and selectively picks up, one or the other of a bank of operating devices such as a series of generally parallel levers 60 shown mounted for movement about a common axis 62.

The device 60 so actuated is held in its uppermost position until a change in the setting of the indicator 28 causes the operation of a different device, by means such as a lock or latch bar 64 carried by arms 66 rockable about an axis 68 and urged toward latching position by a spring 70. The bar 64 snaps over the end of the operated lever 60 and holds it in its uppermost position. When subsequently another lever 60 is operated, its beveled end cams the bar 64 back, thereby releasing the previously-operated lever 60.

In the embodiment of Figure 1, the selectively-operated levers 60 engage different points in the length of the inclined lower surface of an arm 72 rigidly secured to and projecting laterally from an actuator, such as a lever 74 mounted for movement about the axis 62, the actuator 74 in turn being connected to the above described link 24. Thus the raising of different ones of the levers 60 lifts the actuators 74 different distances, against the resistance of gravity (reinforced by a suitable spring if desired), thereby variably opening and closing the valve 22 according to the position of the indicator 28.

In the embodiment of Figure 2, the selectively-operated levers 60 engage different points in the length of an actuator such as a lever 80 which extends transversely across the bank of levers 60, and which is connected to the link 24.

It will be seen that periodically, i. e. at each revolution of shaft 40, the tactor 32 engages the indicator 28 giving periodic instantaneous measurements according to which the selector 46 is shifted and the corresponding lever 60 is operated to rock the actuator 74 (or 80) more or less, thereby opening or closing the valve 22 by a fixed amount.

Except in the case where this gives exactly the desired proportion between the flows in the two conduits, the valve 22 is normally alternately shifted back and forth between two positions giving respectively a flow which is slightly too great and one which is slightly too small, with a resultant average giving the desired proportion.

While two illustrative embodiments have been described in detail, it is not my intention to limit the scope of the invention to those particular embodiments, or otherwise than by the terms of the appended claims. This application is a continuation in part of my application No. 482,516, filed September 17, 1930.

I claim:

1. Proportioning apparatus comprising a pair of conduits, a flow meter connected to one conduit and having an indicator deflected as a function of the flow therein, a valve for the other conduit having motor-driven operating means having a variable control, and a selector set by said indicator and varying said control to periodically cause the operating means to set the valve into one or another of a predetermined set of different positions according to the position of the indicator.

2. Proportioning apparatus comprising a valve having an operating member provided with an arm having an inclined surface, a series of generally parallel parts arranged in a bank side by side adjacent said surface, a power-operated member selectively to engage said parts, and an indicator-controlled selector for shifting said power-operated member from one to another of said parts.

3. Proportioning apparatus comprising a valve having an operating member provided with an inclined surface, a series of parts arranged in a bank adjacent said surface, a member selectively to engage said parts, and an indicator-controlled selector for shifting said power-operated member from one to another of said parts.

4. Proportioning apparatus comprising a valve having an operating member provided with an inclined surface, a series of parts arranged in a bank adjacent said surface, a member selectively to engage said parts, an indicator-controlled selector for shifting said power-operated member from one to another of said parts, and means for holding the operated part in its operated position until another of said parts is operated.

5. Proportioning apparatus comprising a valve having an operating member provided with an arm having an inclined surface, a series of generally parallel parts arranged in a bank side by side adjacent said surface, a power-operated member selectively to engage said parts, an indicator-controlled selector for shifting said power-operated member from one to another of said parts, and an elongated device extending across said bank for holding the several operated parts in operated position until subsequent operation of other parts.

6. Proportioning apparatus comprising a valve having an operating member provided with an arm having an operative laterally-extending thrust surface, a series of generally parallel parts arranged in a bank side by side adjacent said surface, a power-operated member selectively to engage said parts, and an indicator-controlled selector for shifting said power-operated member from one to another of said parts.

7. Proportioning apparatus comprising a valve having an operating member provided with an operative laterally-extending thrust surface, a series of parts arranged in a bank adjacent said surface, a member selectively to engage said parts, and an indicator-controlled selector for shifting said power-operated member from one to another of said parts.

8. A flow-varying device having an operator provided with an inclined surface, a bank of separately operable operating devices engageable with different parts of said surface and each actuating said operator on engagement therewith to an extent depending on the part of said surface engaged, and means for selectively operating said devices one at a time.

9. A flow-varying device having an operator provided with an operating arm, a bank of separately operable operating devices engageable with said arm at different points in its length and each actuating said operator on engagement with said arm to an extent depending on the point in the length of the arm engaged, and means for selectively operating said devices one at a time.

10. A flow-varying device having an operator provided with an inclined surface, a bank of operating devices engageable with different parts of said surface, means for selectively operating said devices, and means for holding the device last operated by said means until the subsequent operation of another of said devices.

11. A flow-varying device having an operator provided with an operating arm, a bank of operating devices engageable with said arm at different points in its length, means for selectively operating said devices, and means for holding the device last operated by said means until the subsequent operation of another of said devices.

12. A flow-varying device having a pivoted control lever, a bank of separately operable operating devices arranged to engage said lever at different points in its length, and means for selectively operating said devices one at a time to operate the lever through different angles according to the point of engagement of the operating device.

13. Control mechanism having a pivoted lever having operating means variably controlled according to its angular movement, a bank of operating devices arranged to engage said lever at different points in its length, a power-driven member for operating said devices to operate the lever through different angles according to the point of engagement of the selected operating device, a selector for operatively connecting the power-driven member selectively to different ones of said devices, and measuring means controlling the selector.

14. Control mechanism comprising an actuator having operating means variably controlled according to its degree of movement, a series of separately operable operating devices arranged to engage said actuator at different points and to move it different distances, and means for selectively operating said devices one at a time.

15. Control mechanism comprising an actuator having operating means variably controlled according to its degree of movement, a series of operating devices arranged to engage said actuator at different points and to move it different distances, a power-driven operator, a selector for shifting said operator from one to another of said devices, and measuring means controlling said selector.

16. Control mechanism comprising an actuator having operating means variably controlled according to its degree of movement, a series of operating devices arranged to engage said actuator at different points and to move it different distances, means for selectively operating said devices, and means for holding the operated device until another device is operated.

17. Control mechanism comprising an actuator having operating means variably controlled according to its degree of movement, a series of operating devices arranged to engage said actuator at different points and to move it different distances, a power-driven operator, a selector for shifting said operator from one to another of said devices, measuring means controlling said selector, and means for holding the operated device until another device is operated.

18. That method of proportioning the flow of two fluids which comprises continuously measuring the flow of one fluid, and periodically varying the flow of the other fluid by predetermined steps as a function of the instantaneous measurements of the flow of the first fluid.

19. Control mechanism comprising a stationary abutment, an element deflecting in a path parallel to said abutment in accordance with the variations in a condition, a pivoted actuator operatively connected to a valve mechanism to be controlled and having a control surface, a plurality of pivoted actuating devices adapted to engage said surface at different points along the latter to adjust said actuator to a position depending upon the relative positions of said devices, cam means periodically clamping said element against said abutment and actuating said devices to positions selectively dependent upon the position of said element along said path, whereby said valve is adjusted to a position selectively dependent upon the position of said element longitudinally of said abutment.

20. Control mechanism comprising a stationary abutment, an element deflecting in a path parallel to said abutment in accordance with the variations in a condition, an actuator pivoted to turn about an axis and operatively connected to a valve mechanism to be controlled and having a control surface, a plurality of actuating devices pivoted to turn about an axis parallel to the first mentioned axis and adapted to engage said surface at different points along the latter to adjust said actuator to a position depending upon the relative positions of said devices, cam means periodically clamping said element against said abutment and actuating said devices to positions selectively dependent upon the position of said element along said path, whereby said valve is adjusted to a position selectively dependent upon the position of said element longitudinally of said abutment.

ALBERT F. SPITZGLASS.